United States Patent
Cho et al.

(10) Patent No.: US 9,513,489 B2
(45) Date of Patent: Dec. 6, 2016

(54) 3D IMAGE DISPLAY DEVICE

(71) Applicant: SAMSUNG DISPLAY CO., LTD., Yongin, Gyeonggi-Do (KR)

(72) Inventors: Jung-Hyun Cho, Seoul (KR); Seung Jun Yu, Suwon-Si (KR); Seon Ki Kim, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 65 days.

(21) Appl. No.: 14/285,157

(22) Filed: May 22, 2014

(65) Prior Publication Data

US 2015/0131138 A1   May 14, 2015

(30) Foreign Application Priority Data

Nov. 11, 2013  (KR) .................. 10-2013-0136379

(51) Int. Cl.
- *G02F 1/155* (2006.01)
- *G02B 27/22* (2006.01)
- *G02F 1/153* (2006.01)
- *G02B 5/00* (2006.01)

(52) U.S. Cl.
CPC ........... *G02B 27/2214* (2013.01); *G02F 1/153* (2013.01); *G02B 5/003* (2013.01)

(58) Field of Classification Search
CPC .............. G02F 1/167; G02F 2001/1676; G02F 2001/1678; G02B 5/003; G02B 27/2214
USPC .................. 359/265–275, 296; 345/105, 107
See application file for complete search history.

(56) References Cited

U.S. PATENT DOCUMENTS

| | | | |
|---|---|---|---|
| 5,969,850 A | 10/1999 | Harrold et al. | |
| 7,502,085 B2 * | 3/2009 | Hirai ................. | G02F 1/133528 349/117 |
| 8,115,985 B2 | 2/2012 | Liu | |
| 8,284,242 B2 | 10/2012 | Wang et al. | |
| 8,368,991 B2 | 2/2013 | Yeh et al. | |
| 8,368,993 B2 | 2/2013 | Yeh et al. | |
| 8,436,787 B2 | 5/2013 | Chen et al. | |
| 2009/0231662 A1 * | 9/2009 | Sorensson ................. | G02F 1/15 359/273 |
| 2010/0271685 A1 * | 10/2010 | Liu ..................... | G02B 27/2214 359/265 |

(Continued)

FOREIGN PATENT DOCUMENTS

KR   10-2012-0034540   4/2012

OTHER PUBLICATIONS

Prakash R. Somani, et al., "Electrochromic Materials and Devices: Present and Future," Materials Chemistry and Physics, 77, (2002), p. 117-133.

(Continued)

*Primary Examiner* — Tuyen Tra
(74) *Attorney, Agent, or Firm* — F. Chau & Associates, LLC

(57) ABSTRACT

A stereoscopic image display device includes a barrier panel that includes a first barrier panel configured to partially reflect light, and a second barrier panel provided on the first barrier panel configured to partially absorb light. Each of the first barrier panel and the second barrier panel includes an electrochromic element and electrodes respectively provided on opposite surfaces of the electrochromic element.

20 Claims, 8 Drawing Sheets

(56) References Cited

U.S. PATENT DOCUMENTS

2011/0279884 A1* 11/2011 Fujimura .............. G02F 1/1334
359/270
2012/0081776 A1    4/2012 Yeh et al.
2012/0170115 A1    7/2012 Zhang et al.

OTHER PUBLICATIONS

Graham J. Woodgate, et al., "Flat Panel Autostereoscopic Displays—Characterisation and Enchancement," Proceedings of SPIE vol. 3957, (2000), p. 153-164.
Annemarie Van Geest-Lokhorst, "Reflections on Switchable Mirror Devices," Thesis.
Jin Sun Ryu, et al., "Study on the Correlation Between the Optical Performance of the Reflective Polarizer and the Structure of the Backlight for Large-Size LCD Applications," New Physics: SAE Mulli (The Korean Physical Society), vol. 60, No. 1, 2010, p. 56-62.

* cited by examiner

3D IMAGE DISPLAY DEVICE

CROSS-REFERENCE TO RELATED APPLICATION

This application claims priority from Korean Patent Application No. 10-2013-0136379 filed in the Korean Intellectual Property Office on Nov. 11, 2013, and all the benefits accruing therefrom, the contents of which are herein incorporated by reference in their entirety.

BACKGROUND (a) Field

Embodiments of the present disclosure are directed to a stereoscopic image display device.

(b) Description of the Related Art

An existing technique for displaying a stereoscopic image, that of using binocular disparity to obtain a left eye image and a right eye image and displaying the eye images as one stereoscopic image in the brain has been disclosed.

An auto-stereoscopic display technique has been developed in recent years, and such a structure is roughly divided into two types, i.e., a lenticular type using a lenticular lens and an optical barrier type. The merits and drawbacks of the two types are as follows.

In the case of a lenticular type, a plurality of long, thin band-like convex transparent mirrors are arranged in a repeated pattern along an axial direction, and a display image is divided into left and right images by using optical refraction. Then, the left image and the right image are respectively presented to a left eye and a right eye of a viewer, and a stereoscopic image is recognized using disparity. As compared with an optical barrier type, a lenticular type, in which the display image is divided into the left and right images using light refraction, has little optical light loss and high luminance, but has a restrictive light refractive index. Accordingly, the resolution is degraded by refraction of a frame portion of a lens structure. Further, the lens surface is frequently not smooth due to protrusions and depressions generated thereon by errors in the manufacturing process of a lenticular lens, thereby generating scattered faint light. In this case, errors such as reflection, glitter, grayness, etc., in the image or image quality deterioration caused by the scattered faint light are generated, thereby degrading the display image quality of all 3D images.

In contrast, an optical barrier type controls light emitted at a predetermined angle using barrier objects arranged in series. In this case, a display image limited to the predetermined angle is divided into left and right images using optical refraction. Then, the left image and the right image are respectively projected to a left eye and a right eye of a viewer, and a stereoscopic image is recognized by binocular disparity. As compared to a lenticular type, an image is projected onto one eye, which provides an image with higher precision. However, a lenticular type suffers from poorer luminance over the entire display image and image resolution due to inherent structural characteristics.

Further, a general stereoscopic image display device displays only a stereoscopic image, and thus may not smoothly convert between displaying planar images and stereoscopic images. This is because, since the lenticular lens and the optical barrier are disposed in front of or in back of a general display device, all planar images pass through the lenticular lens or the optical barrier, which divide the planar image into a left image and a right image.

SUMMARY

Embodiments of the present disclosure may provide a stereoscopic image display device that can minimize luminance reduction or improve light efficiency through a dual barrier structure while supplying both a planar image and a stereoscopic image.

An exemplary embodiment of the present disclosure provides a stereoscopic image display device including: a barrier panel that includes a first barrier panel configured to partially reflect light, and a second barrier panel disposed on the first barrier panel configured to partially absorb light. Each the first barrier panel and the second barrier panel includes an electrochromic element, and electrodes respectively provided on opposite surfaces of the electrochromic element.

The stereoscopic image display device may further include a light unit disposed on the first barrier panel; and a display panel disposed on the second barrier panel, wherein the first and second barrier panels are interposed between the light unit and the display panel.

The barrier panel may include a first substrate disposed to face the light unit, and a second substrate disposed to face the display panel.

The electrodes may include an impurity doped oxide selected from a group consisting essentially of indium tin oxide (ITO), indium zinc oxide (IZO), aluminum zinc oxide (AZO), and antimony tin oxide (ATO), or carbon nanotubes.

The electrodes may be piece-like members separated by a predetermined distance from each other.

The electrochromic element may include an electrolyte layer.

Different voltages may be applied to the first barrier panel and the second barrier panel.

The electrodes may have a planar shape.

Another exemplary embodiment of the present disclosure provides a stereoscopic image display device including: a barrier panel that includes: a first barrier panel configured to partially reflect light, and a second barrier panel disposed on the first barrier panel configured to partially absorb light. The first barrier panel includes a first electrochromic element, the second barrier panel includes a second electrochromic element, and the barrier panel further includes a reference electrode provided between the first barrier panel and the second barrier panel.

At least one of the first electrochromic element and the second electrochromic element may include a plurality of piece-like members, each separated by a predetermined distance.

The first electrochromic element may include one of a transition metal hydride and a rare earth metal hydride.

The second electrochromic element may include two layers, a material of one of the two layers may include a transition metal oxide selected from a group of anodic coloration materials consisting essentially of chromium oxide ($Cr_2O_3$), a nickel oxide ($NiO_x$), iridium oxide ($IrO_2$), manganese oxide ($MnO_2$), nickel hydroxide ($Ni(OH)_2$), tantalum pentoxide ($Ta_2O_5$), and iron(III) hexacyanoferrate(II) ($Fe_4[Fe(CN)_6]_3$), and a material of the other layer may include a transition metal oxide selected from a group of cathodic coloration materials consisting essentially of tungsten oxide ($WO_3$), molybdenum oxide ($MoO_3$), niobium oxide ($Nb_2O_3$), titanium oxide ($TiO_2$), strontium titanate ($SrTiO_3$), and tantalum pentoxide ($Ta_2O_5$).

The second electrochromic element may include a transition metal oxide selected from a group of anodic/cathodic coloration materials consisting essentially of vanadium pentoxide (V2O5), rhodium oxide (Rh2O3), and a cobalt oxide (CoOx).

The stereoscopic image display device may further include a light unit disposed on the first barrier panel; and a display panel disposed on the second barrier panel, where the first and second barrier panels are interposed between the light unit and the display panel.

The barrier panel may further include a middle substrate provided between the first barrier panel and the second barrier panel.

The middle substrate may include a plurality of middle substrates, and the stereoscopic image display device may further include an adhesive layer provided between the middle substrates.

Another exemplary embodiment of the present disclosure provides a stereoscopic image display device including: a light unit; a display panel; and a barrier panel interposed between the light unit and the display panel. The barrier panel includes a first barrier panel provided on the light unit, and a second barrier panel provided on the display panel, wherein the first barrier panel and the second barrier panel are independently operated.

The first barrier panel may include a first electrochromic element and a first electrode disposed to face the light unit; the second barrier panel may include a second electrochromic element and a second electrode disposed to face the display panel, and the barrier panel may further includes a reference electrode provided between the first electrochromic element and the second electrochromic element.

The first electrochromic element may includes one of a transition metal hydride and a rare earth metal hydride, and the second electrochromic element may have a dual-layer structure that includes two layers. A material of one of the two layers may include one kind of transition metal oxide selected from a transition metal oxide group of an anodic coloration material consisting of chromium oxide ($Cr_2O_3$), a nickel oxide ($NiO_x$), iridium oxide ($IrO_2$), manganese oxide ($MnO_2$), nickel hydroxide ($Ni(OH)_2$), tantalum pentoxide ($Ta_2O_5$), and iron(III) hexacyanoferrate(II) ($Fe_4[Fe(CN)_6]_3$), and a material of the other layer may include one kind of a transition metal oxide selected from a transition metal oxide group of the cathodic coloration material consisting of tungsten oxide ($WO_3$), molybdenum oxide ($MoO_3$), niobium oxide ($Nb_2O_3$), titanium oxide ($TiO_2$), strontium titanate ($SrTiO_3$), and tantalum pentoxide ($Ta_2O_5$). The first electrochromic element may partially reflect light, and the second electrochromic element may partially absorb light.

The first electrode and the second electrode may each have a pin-hole shape that includes a plurality of piece-like electrode members disposed in a zigzag pattern, and may further include connection members that electrically connect two adjacent piece-like members.

As such, it is possible to improve light efficiency by about 1.3 to 1.5 times by recycling light emitted from the light unit through the barrier panel. Further, it is possible to improve luminance by about 10 to 15% without using a polarizer. In addition, it is possible to provide a stereoscopic image display device providing a stereoscopic image and a planar image through a simpler structure.

DETAILED DESCRIPTION OF EXEMPLARY EMBODIMENTS

Figure 1:
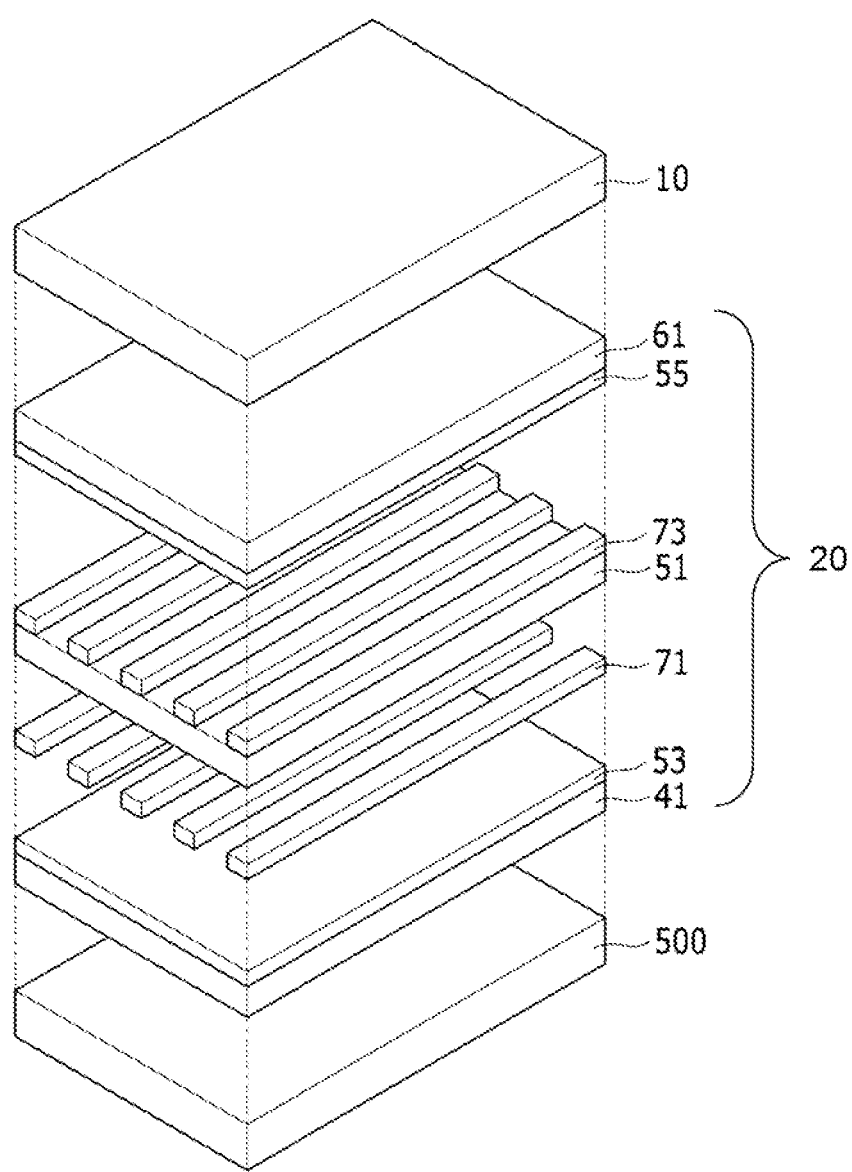
FIG. 1 is an exploded perspective view showing a stereoscopic image display device in accordance with an exemplary embodiment of the present disclosure.

Exemplary embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals may designate like elements throughout the specification. When a first part of a layer, a film, a plate, or the like is described as being arranged "on" or "over" a second part, this indicates that the first part is arranged on or over the second part directly or with a third part therebetween without the limitation to the upper side thereof on the basis of the gravity direction.

A stereoscopic image display device in accordance with an exemplary embodiment of the present disclosure will now be described with reference to FIG. 1 to FIG. 5.

Figure 3:
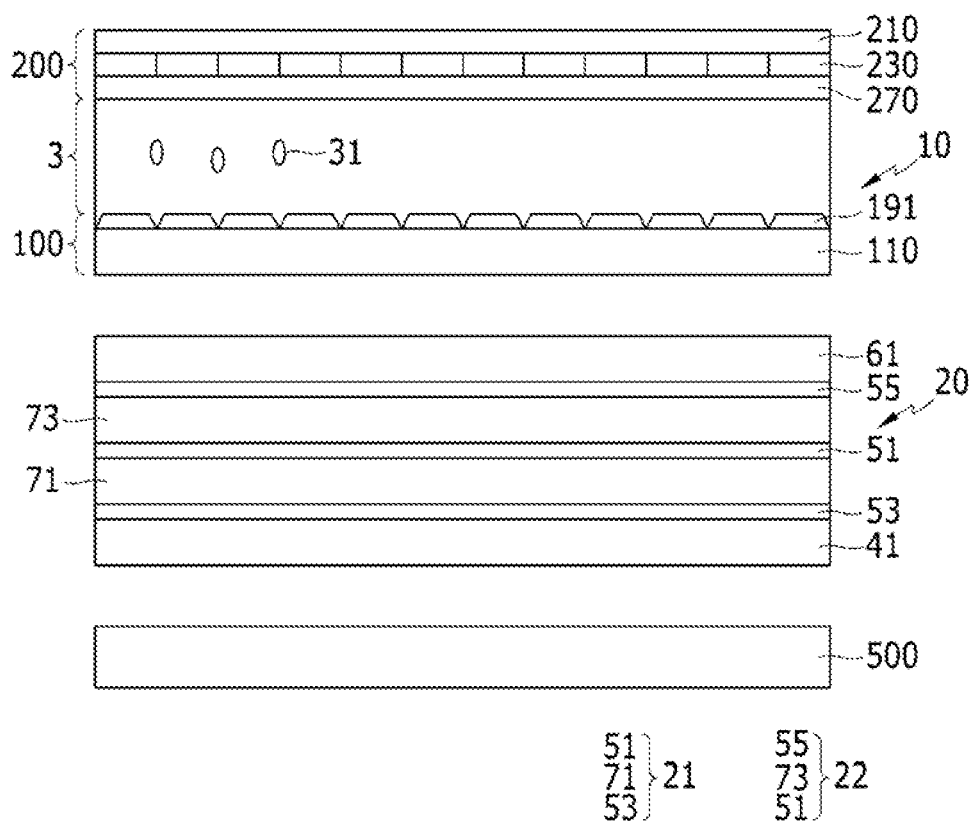
FIG. 3 is a cross-sectional view showing a stereoscopic image display device in accordance with a present exemplary embodiment.

Referring to FIG. 1 and FIG. 3, the stereoscopic image display device of the present exemplary embodiment includes a light unit 500 for emitting light, a barrier panel 20 provided on the light unit 500, and a display panel 10 provided on the barrier panel 20.

The light unit 500 includes a light source for emitting light, and a light guide for receiving the light and guiding it toward the display panel 10 and the barrier panel 20.

For example, in a present exemplary embodiment, the light source may include at least one light emitting diode (LED), and the LED may be disposed on at least one side surface of the light guide. In other words, the light unit 500 may be an edge-type light unit in which the light source is located at a side surface of the light guide. Alternatively, the light unit 500 may be a direct type light unit in which the light source is located directly below a diffuser (not shown), and the light source may include a fluorescent lamp instead of an LED.

The display panel 10 includes a lower substrate 100 that includes a first insulation substrate 110, an upper substrate 200 that includes a second insulation substrate 210 disposed to face the first insulation substrate 110, and a liquid crystal layer 3 interposed between the lower substrate 100 and the upper substrate 200.

The first insulation substrate 110 includes a plurality of pixel electrodes 191 disposed thereon and arranged in a matrix form. The first insulation substrate 110 may further include gate lines that extend in a row direction, data lines that extend in a column direction, and thin film transistors connected in one-to-one correspondence to the pixels electrodes.

A color filter 230 and a common electrode 270 are disposed on the second insulation substrate 210. The color filter 230 may include red, green, and blue color filters R, G, and B, and each of the color filters R, G, and B may be disposed to correspond to one pixel electrode 191.

The common electrode 270 is located on the color filter 230 to generate a vertical electric field together with the pixel electrodes 191.

The liquid crystal layer 3 contains a plurality of liquid crystal molecules 31, and an alignment direction of the liquid crystal molecules 31 is controlled by the vertical electric field. Accordingly, the display panel 10 can display images by controlling transmittance of light received from the light unit 500.

A liquid crystal panel that generates a vertical electric field is shown in FIG. 1 as the display panel 10, but it is not limited thereto. Alternatively, the display panel 10 may include display devices such as a plasma display panel (PDP), a surface conduction electron-emitter display (SED), a field emission display (FED), a vacuum fluorescent display (VFD), an e-paper, etc.

As shown in FIG. 1, the pixel electrodes 191 have a one-to-one correspondence with the color filters R, G, and B. Herein, a pixel corresponding to any one of the red filter R, the green filter G, and the blue filter B is defined as a sub-pixel, and three sub-pixels corresponding to a red filter R, a green filter G, and a blue filter B may be defined as one pixel.

Figure 2:
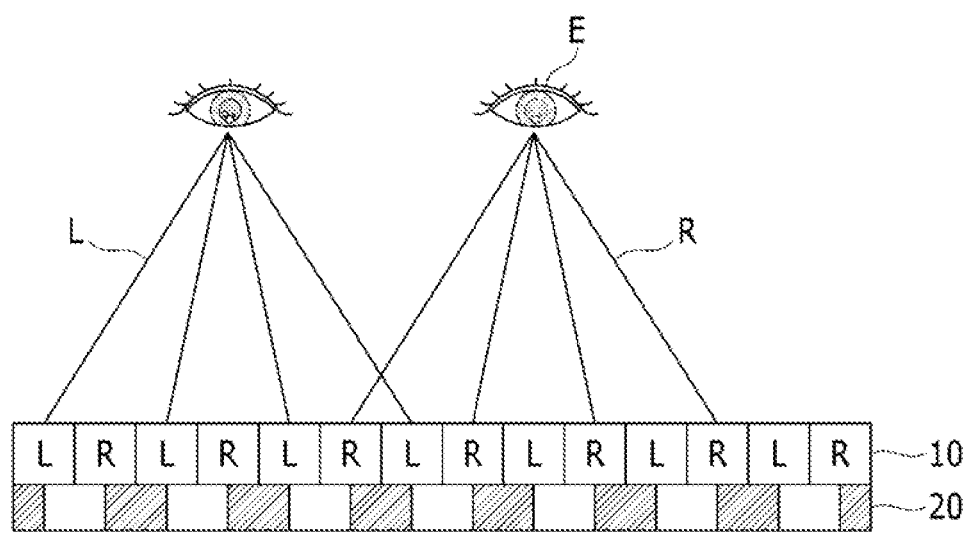
FIG. 2 is a schematic diagram showing a use state related to a present exemplary embodiment.

The barrier panel 20 is located between the display panel 10 and the light unit 500. When the barrier panel 20 is turned off, a general planar image is displayed, while when the barrier panel 20 is turned on, a stereoscopic image is displayed. The principle of displaying a stereoscopic image is shown in FIG. 2.

The barrier panel 20 includes substrates 41 and 61, electrodes 51, 53, and 55, and electrochromic elements 71 and 73. The barrier panel 20 may be organized into a first barrier panel 21 for partially reflecting light emitted from the light unit 500 and a second barrier panel 22 for partially absorbing externally received light.

The first substrate 41 may be located above or on the light unit 500, and the second substrate 61 may be located below the display panel 10, but they are not limited thereto. Alternatively, the substrates 41 and 61 may include an additional substrate as in another exemplary embodiment which will be described below.

A first electrode 53 is disposed on the first substrate 41, and the second electrode 55 is disposed on the second substrate 61.

The materials of the first substrate 41 and the second substrate 61 may include glass, a resin, or a plastic polymer obtained by mixing one or more selected from a group consisting essentially of polyethylene terephthalate (PET), polycarbonate (PC), polyethylene (PE), polyvinylchloride (PVC), polypropylene (PP), polystyrene (PS), and polymethylmethacrylate (PMMA). Further, a substrate 81 which is to be further included in another exemplary embodiment may be made of the same material.

The electrodes 53 and 55 are respectively located above an electrochromic element 71 and below an electrochromic element 73. In other words, the electrodes 53 and 55 are respectively located on opposite surfaces of the electrochromic elements 71 and 73 to apply a voltage difference thereto.

The first electrode 53 is located on the first substrate 41, and the second electrode 55 is located on the second substrate 61. When viewed in an upright direction, the first electrochromic element 71 is located on the first electrode 53. When viewed in an upside-down direction, the second electrochromic element 73 is located on the second electrode 55. Further, when viewed in the upright and upside-down directions, a reference electrode 51 for applying a reference voltage is disposed on the first electrode 53 and the second electrode 55, respectively. As a result, in accordance with a present exemplary embodiment, the reference electrode 51 may be shared by the first barrier panel 21 and the second barrier panel 22.

The reference electrode 51 may apply a reference voltage, while the first electrode 53 and the second electrode 55 may apply different voltages. This is because the first electrochromic element 71, located between the first electrode 53 and the reference electrode 51, may realize a reflecting state according to the voltage applied therebetween, and the second electrochromic element 73, located between the second electrode 55 and the reference electrode 51, may realize an absorbing state according to the voltage applied therebetween. Accordingly, a voltage that can realize a reflective first electrochromic element 71 may be applied to the first electrode 53 according to a voltage difference with respect to the reference electrode 51, and a voltage that can realize an absorbent second electrochromic element 73 may be applied to the second electrode 55 according to a voltage difference with respect to the reference electrode 51.

As shown in FIG. 1 and FIG. 3, the first electrode 53 and the second electrode 55 may have a surface-shape that covers the substrates 41 and 61. Alternatively, each of the first electrode 53 and the second electrode 55 may be embodied as strip-pattern-like members that are sequentially and alternately arranged at a predetermined interval. Further alternatively, each of the first electrode 53 and the second electrode 55 may be embodied in a pin-hole pattern. This will be described in more detail below.

The materials of the first electrode 53, the second electrode 55, and the reference electrode 51 may be an impurity-doped oxide selected from a group consisting essentially of indium tin oxide (ITO), indium zinc oxide (IZO), aluminum zinc oxide (AZO), and antimony tin oxide (ATO), or carbon nanotubes, but they are not limited thereto. Alternatively, the first electrode 53, the second electrode 55, and the reference electrode 51 may be formed of a RE-Mg hydride film, depending on the material of the electrochromic element.

The first barrier panel 21 may include the first electrode 53, the reference electrode 51, with the first electrochromic element 71 located therebetween.

The first electrochromic element 71 may be formed between the first electrode 53 and the reference electrode 51 by using a sol-gel method, a sputtering method, a plating method, a screen printing method, an anodizing method, a photopolymerization method, or a laser etching method.

The material of the first electrochromic element 71 may include a transition metal hydride and a rare earth metal hydride. In the transition metal hydride, the transition metal may be magnesium. The transition metal hydride may further contain a rare earth metal such as $GdMgH_3$ and MgTmH. Further, in the rare earth metal hydride, the rare earth metal may be yttrium or lanthanum. When a predetermined voltage difference is applied to the first electrochromic element 71 formed of such a material, the first electrochromic element 71 becomes reflective. A reflective first electrochromic element 71 can increase light efficiency by partially reflecting light emitted from the light unit 500 that is propagating through the reflection region toward the light unit 500.

Figure 4:
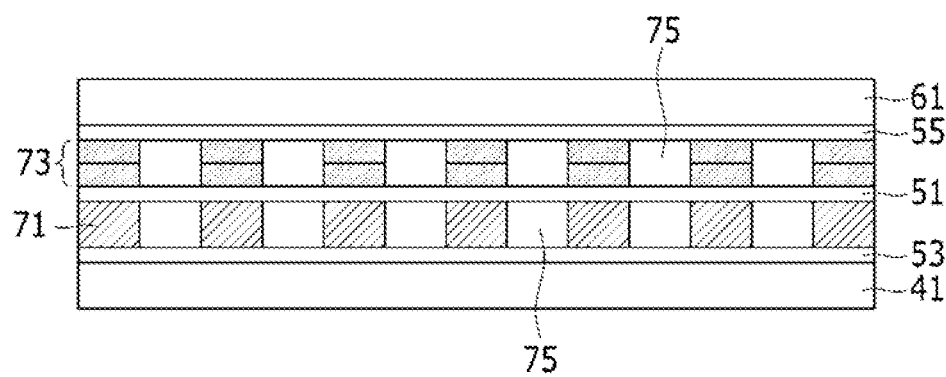
FIG. 4 and FIG. 5 are cross-sectional views showing a barrier panel in accordance with a present exemplary embodiment.

As shown in FIG. 1 and FIG. 4, the first electrochromic element 71 may have piece-like members or may have a planar shape, but it is not limited thereto. If the first electrochromic element 71 has piece-like members, isotropic materials 75 may be provided between the piece-like members.

The second barrier panel 22 may include the second electrode 55, the reference electrode 51, and the second electrochromic element 73 located therebetween.

The second electrochromic element 73 may be formed between the second electrode 55 and the reference electrode 51 by using a sol-gel method, a sputtering method, a plating method, a screen printing method, an anodizing method, a photopolymerization method, or a laser etching method.

As shown in FIG. 1 and FIG. 4, the second electrochromic element 73 may have piece-like members or may have a planar shape, but it is not limited thereto. If the second electrochromic element 73 has piece-like members, the isotropic materials 75 may be provided between the piece-like members.

Further, the second electrochromic element 73 may have a dual-layer structure, and may use a transition metal oxide formed of an anodic coloration material and an anodic/cathodic coloration material, or any one compound selected from an organic compound group.

Herein, it should be noted that if the second electrochromic element 73 has a dual-layer structure, the layers complement each other. For example, when an anodic coloration material is used as one of the two layers, the other layer is a cathodic coloration material. On the contrary, when a cathodic coloration material is used as one of the two layers, the other layer is an anodic coloration material. Alternatively, both the anodic/cathodic coloration material may be simultaneously used as the materials of the two layers.

In general, an example of an anodic coloration material may include a transition metal oxide selected from a group of anodic coloration materials consisting essentially of chromium oxide ($Cr_2O_3$), a nickel oxide ($NiO_x$), iridium oxide ($IrO_2$), manganese oxide ($MnO_2$), nickel hydroxide ($Ni(OH)_2$), tantalum pentoxide ($Ta_2O_5$), and iron(III) hexacyanoferrate(II) ($Fe_4[Fe(CN)_6]_3$).

An example of cathodic coloration material may include a transition metal oxide selected from a group of cathodic coloration materials consisting essentially of tungsten oxide ($WO_3$), molybdenum oxide ($MoO_3$), niobium oxide ($Nb_2O_3$), titanium oxide ($TiO_2$), strontium titanate ($SrTiO_3$), and tantalum pentoxide ($Ta_2O_5$).

An example of the anodic/cathodic coloration material may include a transition metal oxide selected from a group of anodic/cathodic coloration materials consisting essentially of vanadium pentoxide ($V_2O_5$), rhodium oxide ($Rh_2O_3$), and cobalt oxide ($CoO_x$). Otherwise, a transition metal oxide such as vanadium pentoxide ($V_2O_5$) used as a solid electrolyte or an ion conductive layer may be used.

The material of the second electrochromic element 73 has a property in which color may be reversibly changed by generation of a reversible oxidation reduction reaction caused by application of voltage or current. Initially, applying a voltage to any one layer and the other layer of the second electrochromic element 73 causes accumulated ions to diffuse and move to simultaneously inject electrons.

Referring to FIG. 4, the second electrochromic element 73 may change from a transparent state to a color formation state. Further, the second electrochromic element 73 may return from the color formation state to the transparent state when the voltage applied to the electrochromic element 73 is interrupted by the formation of a non-transparent light blocking region.

In the second electrochromic element 73, the color thereof changes and a plurality of color-deepened light blocking regions may be formed at predetermined intervals due to changes in the electrical conductivities of the second electrode 55 and the reference electrode 51, since the electrodes are electrically connected to each other.

The second electrochromic element 73 may also be formed between the second electrode 55 and the reference electrode 51 by using a sol-gel method, a sputtering method, a plating method, a screen printing method, an anodizing method, a photopolymerization method, or a laser etching method.

An operation of the barrier panel 20 in accordance with a present exemplary embodiment will be described with reference to FIG. 4 and FIG. 5. Referring to FIG. 4, a predetermined voltage is applied to the reference electrode 51, the first electrode 53, and the second electrode 55 to generate a voltage difference. In this case, the first electrochromic element 71 has piece-like members and becomes reflective, while the second electrochromic element 73 corresponding to the first electrochromic element 71 becomes absorbent. Accordingly, light that is propagating from the light unit 500 located below the first barrier panel 21 to the first electrochromic element 71 is partially reflected back to the light unit 500, and external light received by the second electrochromic element 73, which is located below the display panel 10, is partially absorbed. The other regions may be filled with the isotropic materials 75, and light propagates through the regions to display a stereoscopic image.

Figure 5:
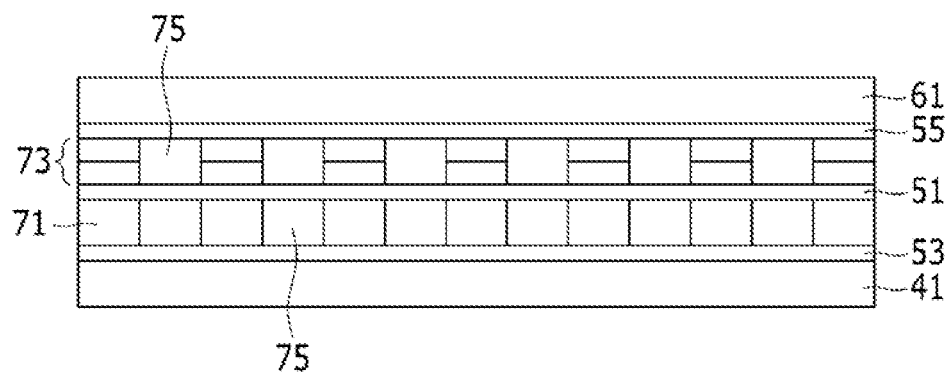

Referring to FIG. 5, the first electrochromic element 71 and the second electrochromic element 73 are non-operational if no additional voltage is applied to the electrochromic elements 71 and 73. In this case, all the light emitted from the light unit 500 may pass through the display panel 10 to provide a planar image.

In addition, independently operable first and second barrier panels may be provided. Accordingly, the first barrier panel may be operated while the second barrier panel is not operated. In this case, a reflective first barrier panel 21 can reflect externally received light, and when the display panel 10 does not display an image, the display device can serve as a mirror.

As described above, when a stereoscopic image divided into a right eye image and a left eye image is displayed by the barrier panel 20 and the display panel 10, image regions that partially overlap the light blocking regions can be removed. Accordingly, when a stereoscopic image is visually displayed, it is possible to display the stereoscopic image with high image quality without generating interference.

A barrier panel in accordance with modifications of a present exemplary embodiment will be described with reference to FIG. 6 and FIG. 7

Figure 6:
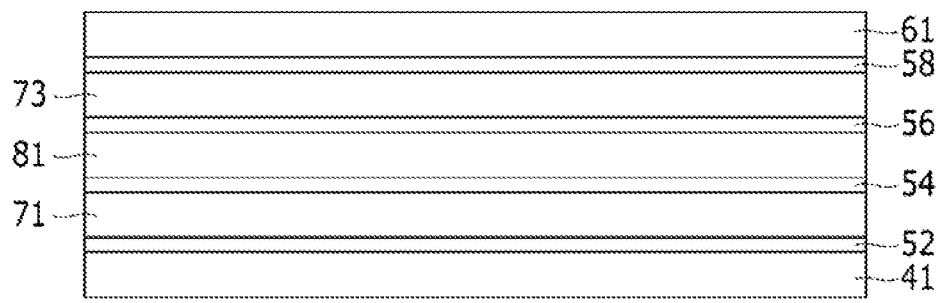
FIG. 6 is a cross-sectional view showing a barrier panel in accordance with a first modification of a present exemplary embodiment.
Figure 7:
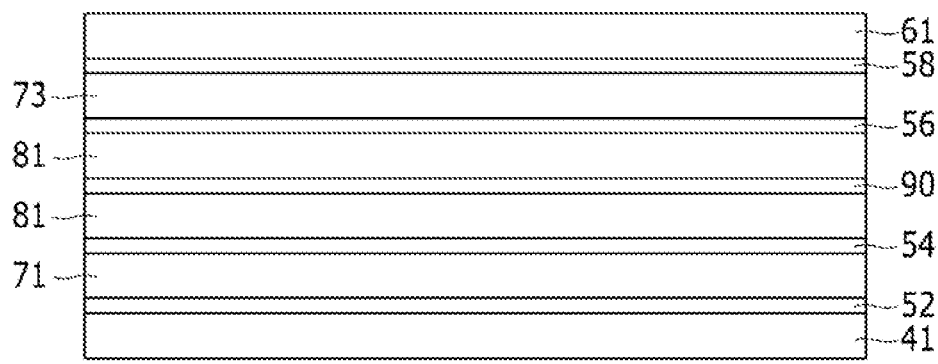
FIG. 7 is a cross-sectional view showing a barrier panel in accordance with a second modification of a present exemplary embodiment.

FIG. 6 is a cross-sectional view showing a barrier panel in accordance with a modification of a present another exemplary embodiment, and FIG. 7 is a cross-sectional view showing a barrier panel in accordance with another modification of a present another exemplary embodiment.

Referring to FIG. 6, a first barrier panel is disposed on the first substrate 41 and includes the first electrochromic element 71. Electrodes 52 and 54 are disposed on opposite surfaces of the first electrochromic element 71 to apply a voltage difference thereto.

The first electrochromic element 71 becomes reflective by the voltage difference between the electrodes 52 and 54 to reflect light received from the light unit 500.

The second barrier panel is disposed on the second substrate 61 and includes the second electrochromic element 73. Electrodes 56 and 58 are disposed on opposite surfaces of the second electrochromic element 73 to apply a voltage difference thereto.

In this case, the second electrochromic element 73 becomes absorbent by the voltage difference between the electrodes 56 and 58 to absorb outside light.

Unlike an aforementioned exemplary embodiment, the first barrier panel 21 and the second barrier panel 22 do not share the reference electrode 51, and a middle substrate 81 is further provided between the adjacent electrodes 54 and 56 in the first barrier panel 21 and the second barrier panel 22.

Further, FIG. 6 does not show a detailed shape of the electrode or the electrochromic element, but as described above, the electrode or the electrochromic element may have piece-like members, a planar shape, or a combination thereof.

Referring to FIG. 7, a first barrier panel is disposed on the first substrate 41, and includes the first electrochromic element 71. The electrodes 52 and 54 are disposed on opposite surfaces of the first electrochromic element 71 to apply a voltage difference thereto. The first electrochromic element 71 becomes reflective by the voltage difference between the electrodes 52 and 54 to reflect light received from the light unit 500.

In this case, the electrode 52 is located on the first substrate 41 when FIG. 7 is viewed in the upright direction, and the electrode 54 is located on the middle substrate 81 when FIG. 7 is viewed in the upside-down direction.

The second barrier panel is disposed on the second substrate 61, and includes the second electrochromic element 73. The electrodes 56 and 58 are disposed on opposite surfaces of the second electrochromic element 73 to apply a voltage difference thereto. The second electrochromic element 73 becomes absorbent by the voltage difference between the electrodes 56 and 58 to absorb outside light.

In this case, the electrode 58 is located on the second substrate 61 when FIG. 7 is viewed in the upside-down direction, and the electrode 56 is located on the middle substrate 81 when FIG. 7 is viewed in the upright direction.

Unlike a modification described with reference to FIG. 6, the first barrier panel 21 and the second barrier panel 22 do not share the middle substrate 81, and each of them includes a middle substrate 81. In this case, the middle substrates 81 included in the barrier panels 21 and 22 may be attached to each other by an adhesive layer 90.

Figure 8:
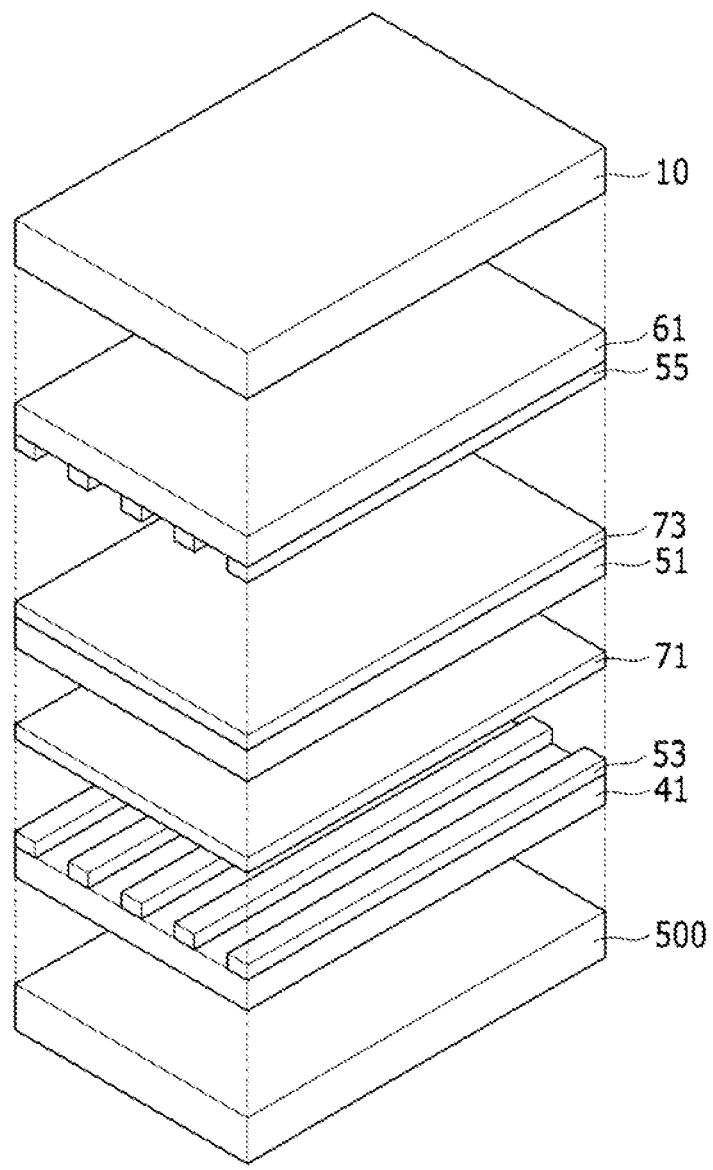
FIG. 8 is a perspective view showing a stereoscopic image display device in accordance with another exemplary embodiment of the present disclosure.

Hereinafter, a stereoscopic image display device including an electrode with a different shape will be described with reference to FIG. 8 to FIG. 11 in accordance with another exemplary embodiment of the present disclosure. FIG. 8 is a perspective view showing a stereoscopic image display device in accordance with another exemplary embodiment of the present disclosure, FIG. 9 is a cross-sectional view showing a barrier panel shown in FIG. 8, FIG. 10 is a top plan view showing an electrode shown in FIG. 8, and FIG. 11 is a top plan view showing an electrode in accordance with a modification of a present exemplary embodiment.

Figure 9:
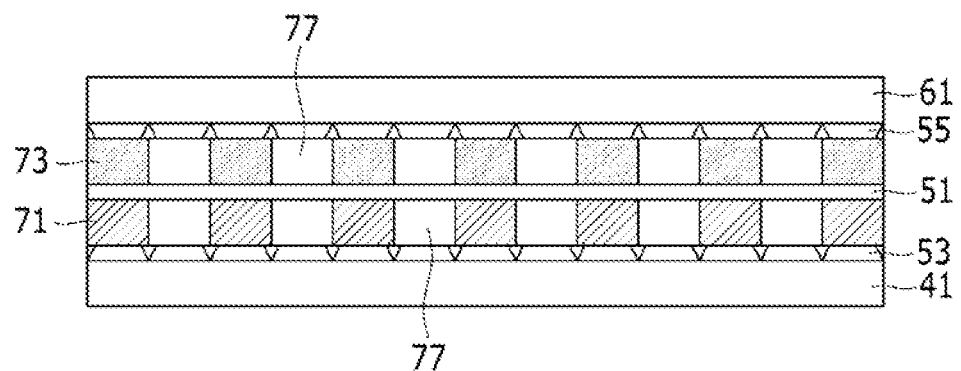
FIG. 9 is a cross-sectional view showing a barrier panel shown in FIG. 8.
Figure 10:
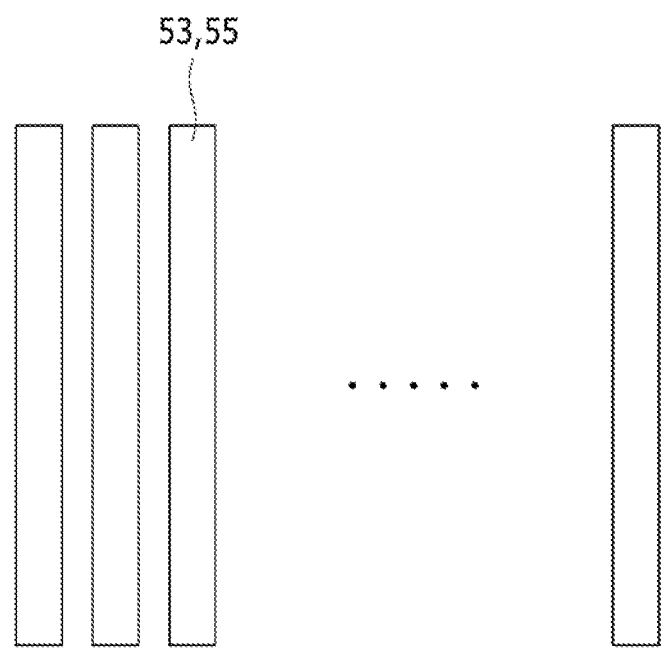
FIG. 10 is a top plan view showing an electrode shown in FIG. 8.
Figure 11:
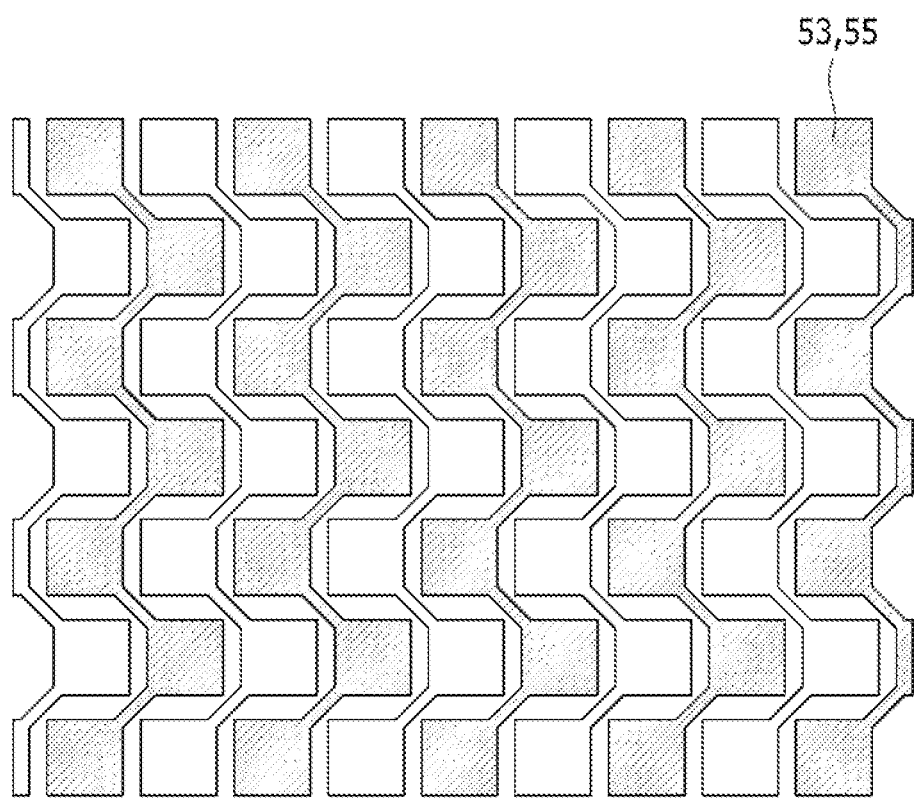
FIG. 11 is a top plan view showing an electrode in accordance with a modification of a present exemplary embodiment.

Referring to FIG. 8 to FIG. 10, the first electrode 53 and the second electrode 55 may have strip-pattern members that are sequentially and alternately arranged at predetermined intervals on the respective surfaces of the first substrate 41 and the second substrate 61. In a present exemplary embodiment, the first electrochromic element 71 and the second electrochromic element 73 are shown as piece-like members that are separately disposed at predetermined intervals. In addition, in a modification, the electrodes 53 and 55 have piece-like members as shown in FIG. 10.

The piece-like members of each of the electrodes 53 and 55 may be relatively widely separated as shown in FIG. 8 or have substantially no separation as shown in FIG. 9. For widely separated members, the reflective or absorbent states of the electrochromic element can be realized by applying the voltage difference to each electrode. For narrowly separated members, the reflective or absorbent states can be realized by applying the voltage difference to some of the electrodes.

The electrochromic elements 71 and 73 are located at the regions at which the piece-like member electrodes are disposed and may have a planar shape as shown in FIG. 8. The planar shaped electrochromic elements 71 and 73 are supplied with voltage differences to realize the reflective or absorbent states, and regions 77 that receive no voltage form a pass-through state to provide a stereoscopic image.

Alternatively, the electrochromic elements 71 and 73 may also be embodied as piece-like members corresponding to the electrodes without being limited thereto.

Referring to FIG. 11, the first electrode 53 and the second electrode 55 may have a pin-hole shape. In detail, the electrodes 53 and 55 may include a plurality of piece-like electrode members which are disposed in a zigzag pattern.

A connection member for electrically connecting two adjacent piece-like members may be further included. The connection electrode may be integrally formed in the two adjacent piece-like electrode members.

Further, the piece-like electrode members may have a square shape, but are not limited thereto.

The first electrode 53 and the second electrode 55 may be used for the aforementioned exemplary embodiments, and the electrochromic elements 71 and 73 located between the electrodes 53 and 55 may have a planar shape corresponding to the electrodes 53 and 55.

As such, a stereoscopic image display device in accordance with exemplary embodiments of the present disclosure can improve light efficiency and luminance by including a first barrier panel for reflecting and recycling light emitted from a light unit and a second barrier unit for absorbing external light.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:
1. A stereoscopic image display device comprising:
a barrier panel that includes
a first barrier panel configured to reflect light, and
a second barrier panel disposed on the first barrier panel configured to absorb light, wherein each of the first barrier panel and the second barrier panel includes:
an electrochromic element; and
electrodes respectively provided on opposite surfaces of the electrochromic element,
wherein the electrochromic element of the first barrier panel and the electrochromic element of the second barrier panel are parallel to each other.

2. The stereoscopic image display device of claim 1, further comprising:
a light unit disposed on the first barrier panel; and
a display panel disposed on the second barrier panel, wherein the first and second barrier panels are interposed between the light unit and the display panel.

3. The stereoscopic image display device of claim 2, wherein the barrier panel includes:
a first substrate disposed to face the light unit; and
a second substrate disposed to face the display panel.

4. The stereoscopic image display device of claim 1, wherein the electrodes include an impurity doped oxide selected from a group consisting essentially of indium tin oxide (ITO), indium zinc oxide (IZO), aluminum zinc oxide (AZO), and antimony tin oxide (ATO), or carbon nanotubes.

5. The stereoscopic image display device of claim 1, wherein the electrodes include piece-like members separated by a predetermined distance from each other.

6. The stereoscopic image display device of claim 1, wherein the electrochromic element includes an electrolyte layer.

7. The stereoscopic image display device of claim 1, wherein different voltages are applied to the first barrier panel and the second barrier panel.

8. The stereoscopic image display device of claim 1, wherein the electrodes have a planar shape.

9. A stereoscopic image display device comprising:
a barrier panel that includes
a first barrier panel configured to reflect light, and
a second barrier panel disposed on the first barrier panel configured to absorb light,
wherein the first barrier panel includes a first electrochromic element,
the second barrier panel includes a second electrochromic element, and
the barrier panel further includes a planar-shaped reference electrode provided between the first barrier panel and the second barrier panel, and
wherein the first barrier panel further comprises a stripe-shape electrode and the second barrier panel comprises a stripe-shape electrode.

10. The stereoscopic image display device of claim 9, wherein at least one of the first electrochromic element and the second electrochromic element includes a plurality of piece-like members, each separated by a predetermined distance, and
wherein the electrochromic element of the first barrier panel and electrochromic element of the second barrier panel are parallel to each other.

11. The stereoscopic image display device of claim 9, wherein the first electrochromic element includes one of a transition metal hydride and a rare earth metal hydride.

12. The stereoscopic image display device of claim 9, wherein the second electrochromic element includes two layers,
a material of one of the two layers includes a transition metal oxide selected from a group of anodic coloration materials consisting essentially of chromium oxide ($Cr_2O_3$), a nickel oxide ($NiO_x$), iridium oxide ($IrO_2$), manganese oxide ($MnO_2$), nickel hydroxide ($Ni(OH)_2$), tantalum pentoxide ($Ta_2O_5$), and iron(III)hexacyanoferrate(II)($Fe_4[Fe(CN)_6]_3$), and
a material of the other layer includes a transition metal oxide selected from a group of cathodic coloration materials consisting essentially of tungsten oxide ($WO_3$), molybdenum oxide ($MoO_3$), niobium oxide ($Nb_2O_3$), titanium oxide ($TiO_2$), strontium titanate ($SrTiO_3$), and tantalum pentoxide ($Ta_2O_5$).

13. The stereoscopic image display device of claim 9, wherein the second electrochromic element includes a transition metal oxide selected from a group of anodic/cathodic coloration materials consisting essentially of vanadium pentoxide ($V_2O_5$), rhodium oxide ($Rh_2O_3$), and a cobalt oxide ($CoO_x$).

14. The stereoscopic image display device of claim 9, further comprising:
a light unit disposed on the first barrier panel; and
a display panel disposed on the second barrier panel, wherein the first and second barrier panels are interposed between the light unit and the display panel.

15. The stereoscopic image display device of claim 9, wherein the barrier panel further includes a middle substrate provided between the first barrier panel and the second barrier panel.

16. The stereoscopic image display device of claim 15, wherein the middle substrate includes a plurality of middle substrates, and
the stereoscopic image display device further includes an adhesive layer provided between the middle substrates.

17. A stereoscopic image display device comprising:
a light unit;
a display panel; and
a barrier panel interposed between the light unit and the display panel that includes
a first barrier panel provided on the light unit, and
a second barrier panel provided on display panel,
wherein the first barrier panel and the second barrier panel are independently operated, and an electrochromic element of the first barrier panel and an electrochromic element of the second barrier panel are parallel to each other.

18. The stereoscopic image display device of claim 17, wherein the first barrier panel includes a first electrochromic element and a first electrode disposed to face the light unit;
the second barrier panel includes a second electrochromic element and a second electrode disposed to face the display panel, and
the barrier panel further includes a reference electrode provided between the first electrochromic element and the second electrochromic element.

19. The stereoscopic image display device of claim 18, wherein a material of the first electrochromic element includes one of a transition metal hydride and a rare earth metal hydride,
wherein the second electrochromic element has a dual-layer structure that includes two layers,
a material of one of the two layers includes one kind of transition metal oxide selected from a transition metal oxide group of an anodic coloration material consisting of chromium oxide ($Cr_2O_3$), a nickel oxide ($NiO_x$), iridium oxide ($IrO_2$), manganese oxide ($MnO_2$), nickel hydroxide ($Ni(OH)_2$), tantalum pentoxide ($Ta_2O_5$), and iron(III) hexacyanoferrate(II) ($Fe_4[Fe(CN)_6]_3$), and
a material of the other layer includes one kind of a transition metal oxide selected from a transition metal oxide group of the cathodic coloration material consisting of tungsten oxide ($WO_3$), molybdenum oxide ($MoO_3$), niobium oxide ($Nb_2O_3$), titanium oxide ($TiO_2$), strontium titanate ($SrTiO_3$), and tantalum pentoxide ($Ta_2O_5$), wherein the first electrochromic element reflects light, and the second electrochromic element absorbs light.

20. The stereoscopic image display device of claim 18, wherein the first electrode and the second electrode each have a pin-hole shape that includes a plurality of piece-like electrode members disposed in a zigzag pattern, and further including connection members that electrically connect two adjacent piece-like members.

\* \* \* \* \*